United States Patent
Chen et al.

(10) Patent No.: US 12,255,523 B2
(45) Date of Patent: Mar. 18, 2025

(54) SOFT-SWITCHING MODULATION FOR ACTIVE CLAMPED PHASE-SHIFT FULL-BRIDGE CONVERTER

(71) Applicant: Analog Devices, Inc., Wilmington, MA (US)

(72) Inventors: Siyuan Chen, Santa Clara, CA (US); Michael George Negrete, Cupertino, CA (US)

(73) Assignee: Analog Devices, Inc., Wilmington, MA (US)

( * ) Notice: Subject to any disclaimer, the term of this patent is extended or adjusted under 35 U.S.C. 154(b) by 324 days.

(21) Appl. No.: 18/053,564

(22) Filed: Nov. 8, 2022

(65) Prior Publication Data

US 2024/0154516 A1     May 9, 2024

(51) Int. Cl.
| | | |
|---|---|---|
| *H02M 7/219* | (2006.01) | |
| *H02M 1/00* | (2006.01) | |
| *H02M 7/04* | (2006.01) | |

(52) U.S. Cl.
CPC ....... *H02M 1/0058* (2021.05); *H02M 1/0043* (2021.05); *H02M 7/05* (2021.05); *H02M 7/219* (2013.01)

(58) Field of Classification Search
CPC .... H02M 1/0058; H02M 1/0043; H02M 7/05; H02M 7/219
See application file for complete search history.

(56) References Cited

U.S. PATENT DOCUMENTS

| | | | |
|---|---|---|---|
| 10,938,309 B1* | 3/2021 | Malechek | H02M 3/33584 |
| 2023/0198417 A1* | 6/2023 | Torrico-Bascopé | H02M 1/4241 363/16 |
| 2023/0246556 A1* | 8/2023 | Gu | H02M 3/33584 |

OTHER PUBLICATIONS

"UCC28951 Phase-Shifted Full-Bridge Controller for Wide-Input Voltage Range Applications", Texas Instruments, (Dec. 2021), 80 pgs.
"ADP1052 Digital Controller for Isolated Power Supply with PMBus Interface", Analog Devices, Inc., (2017), 113 pgs.

* cited by examiner

*Primary Examiner* — Adolf D Berhane
(74) *Attorney, Agent, or Firm* — Schwegman Lundberg & Woessner, P.A.

(57) ABSTRACT

A soft-switching Phase-Shift Full-Bridge (PSFB) converter system may include a transformer comprising a primary side and a secondary side. Phase-leading circuitry and phase-lagging circuitry may be located on the primary side of the transformer. The phase leading a phase lagging circuitry may include one or more bridge switches. The system may further include clamping circuitry coupled to the secondary side of the transformer. The clamping circuitry configurable to, when in an active clamping mode, short the secondary side of the transformer. An inductance may be included on the primary side of the transformer to collect and store energy from an input source when the secondary side of the transformer is shorted. The energy stored in the inductance may be used to enable soft-switching of the bridge switches in the phase-lagging circuitry during a dead time or a circulating time of the bridge switches in the phase-leading circuitry.

20 Claims, 5 Drawing Sheets

502 — ACTIVATE CLAMPING CIRCUITRY COUPLED TO A SECONDARY SIDE OF A TRANSFORMER OF A PHASE-SHIFT FULL-BRIDGE CONVERTER

504 — SHORT THE SECONDARY SIDE OF THE TRANSFORMER

506 — SWITCH A SYNCHRONOUS RECTIFIER SWITCH WHEN THE VOLTAGE ACROSS THE SWITCH MEETS A CRITERION

508 — SWITCH A FIRST PRIMARY SIDE BRIDGE SWITCH

510 — COLLECT ENERGY FROM AN INPUT SOURCE

512 — STORE THE ENERGY COLLECTED FROM THE INPUT SOURCE IN AN INDUCTANCE ON THE PRIMARY SIDE OF THE TRANSFORMER

514 — USE THE STORED ENERGY TO ENABLE SOFT SWITCHING OF A SECOND PRIMARY SIDE BRIDGE SWITCH

Fig. 5

SOFT-SWITCHING MODULATION FOR ACTIVE CLAMPED PHASE-SHIFT FULL-BRIDGE CONVERTER

TECHNICAL FIELD

The present disclosure relates to a soft-switching modulation scheme for an active clamped phase-shift full bridge converter.

BACKGROUND

Phase-shifted full bridge (PSFB) converters are used in a variety of applications to step-down high DC voltages and/or to provide isolation in medium to high-power applications. These applications can include electric vehicle low direct current (EV LDC) chargers, data center or server power supplies, telecommunication rectifiers, and renewable energy systems.

PSFB converters generally include electronic switches such as Field Effect Transistors (FETs) or Insulated-Gate Bipolar Transistors (IGBTs) that form a full bridge on the primary side of an isolation transformer and diode rectifiers or FET switches for synchronous rectification (SR) on the secondary side of the transformer.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

SUMMARY

A soft-switching Phase-Shift Full-Bridge (PSFB) converter system can include a PSFB converter circuit with a transformer, phase-leading circuitry and phase-lagging circuitry (e.g., a leading leg and a lagging leg) located on the primary side of the transformer. The terms phase-leading circuitry and leading-leg circuitry are used interchangeably in this disclosure. Similarly, the terms phase-lagging circuitry and lagging-leg circuitry are used interchangeably. The secondary side of the transformer can include clamping circuitry and one or more synchronous rectifier (SR) switches. The SR switches can help to reduce conduction loss and to increase efficiency, and the active clamping circuitry of the transformer can be used to clamp the voltage spikes across the SR switch or switches. A leakage inductance energy collector (e.g., an inductor) can be coupled to the synchronous rectifier switch and can be configured to collect leakage inductance energy and use that collected leakage inductance energy to enable soft-switching of the synchronous rectifier switch. As used herein, the term "soft-switching" may include switching any switches or devices such as the synchronous rectifier switches or switches or devices on the primary side of the transformer when a voltage across the switches meets a criterion. For example, a device may be switched when the voltage across the device reaches a threshold value or is within a range (e.g., between zero and ten volts).

The primary side of the inductor can include one or more primary side devices, such as a first primary side bridge switch coupled to or included in the phase-leading circuitry and/or a second primary side bridge switch coupled to or included in the phase-lagging circuitry. The PSFB converter system can also include an inductance (e.g., an inductor) located on the primary side of the transformer to collect and store energy from an input source. The clamping circuitry, such as can include the SR switches, can, when in an active mode, short the secondary side of the transformer, and the inductor on the primary side of the transformer can collect and store energy from the input source when the secondary side of the transformer is shorted. The clamping circuitry can also help reduce or eliminate voltage spikes in the primary side devices (e.g., the switches of the leading-leg circuitry and the lagging-leg circuitry), and energy stored in the primary side inductor can be used to enable soft-switching of the devices or switches in the lagging-leg circuitry. For example, energy from the input source can be collected and stored in the primary side inductor while the devices in the leading-leg circuitry are "on" (e.g., during a circulating time) or when they are switched "on" or "off" (e.g., during a dead time or transition time from an "on" state to an "off" state, or vice-versa) and used for soft-switching of the devices in the lagging-leg circuitry.

The soft-switching can be achieved using a switching or modulation scheme or a switching sequence in which the SR switches can be turned "on" before the switches of the leading-leg circuitry are turned "on". Similarly, the clamping switches (e.g., clamping Field Effect transistors (FETs) can be turned "off" before the SR switches are turned "on" with a pre-defined dead time. When the active clamping switches are "on", energy stored in a clamping capacitor can be released to the leakage inductance of the transformer, and that energy can be used to induce zero-voltage, low-voltage, or soft switching of the SR switches. This can allow the SR switches to be turned "on" before the switches of the leading-leg circuitry. Such a switching sequence can assist in the soft-switching of the primary side devices (the switches of the leading and lagging leg circuitry) under both heavy-load and light-load conditions.

DETAILED DESCRIPTION

The Phase-shifted full bridge (PSFB) converter circuit can be used to convert high-voltage to low-voltage. It is a suitable topology for high-current applications such as electric vehicle low DC (EV LDC) chargers or data center power supplies. PSFBs can use synchronous rectifiers (SRs) to reduce conduction loss and to increase efficiency (e.g., power use). PSFB circuits can include a transformer and clamping circuitry ("clampers"), which can allow the SRs to clamp voltage spikes that occur because of the transformer's leakage inductance. Power losses, such as switching losses can occur when a device such as a switch is transitioning from a blocking or "OFF" state to a conducting, circulating, or "ON" state (and vice-versa). When the switch is in this transitioning state (e.g., during a time interval) significant voltage and current can pass through the device in the form of a voltage spike and/or a current spike. There are generally two types of switching that can occur, hard switching and soft switching. The switching methods are based on the relationship of the current and voltage during the turn-on and turn-off of the FETs or the IGBTs. In hard switching, collector current and collector-emitter voltage change sharply, which can result in switching noise and switching loss. In contrast, soft switching can turn devices "on" and "off" at zero or low current or zero or low voltage.

A key challenge in PSFB converters is determining how to provide soft-switching of the primary-side lagging-leg devices, especially under light load conditions (e.g., below ten percent of a device's rated load). Disclosed herein is a soft-switching modulation scheme for an active clamped PSFB converter. The modulation scheme can help ensure the soft-switching of the primary-side devices in an active clamped PSFB converter under both light-load and heavy-load conditions. A PSFB converter can include multiple switches on the primary side on both leading and lagging circuitry (e.g., a leading leg and a lagging leg of the primary side circuitry). While one or more switches on the leading leg are "on" or during a "circulating time," energy from an input source such as a voltage or current source, can be collected and stored in an inductance (e.g., an inductor located on the primary side of the transformer). The "circulating time" can include a time during which both the primary-side and the secondary-side of the transformer are shorted. The energy from an input source such as a voltage or current source, can be collected and stored in an inductance when the secondary side of the transformer is shorted (e.g., only when the secondary side of the transformer is shorted). Using active clamps and SRs, the secondary side of the transformer in the PSFB can be shorted for a certain, pre-defined period of time (e.g., the transition time from a blocking state to a conducting state or the time it takes a device to transition from an "on" state to an "off" state or vice-versa). The leakage inductance of the transformer can absorb additional energy from the input source when the secondary side of the transformer in the PSFB is shorted. For example, the additional energy can be absorbed by the leakage inductance of the transformer in the time between one switching device (e.g., one of the switches coupled to or located on the phase leading circuitry) being turned "off" and a second switching device (e.g., one of the switches coupled to or located on the phase lagging circuitry), being turned "on". The additional energy can then be used for the soft-switching of the lagging leg of the primary-side devices.

Soft-switching can include adding an inductor to the primary side of the transformer. The energy stored in the additional inductor can help the soft-switching of the lagging leg devices. However, the additional inductor alone may not be sufficient as the energy stored in the additional inductor is determined by the output power. Hence, the lagging leg devices can still incur losses under light-load conditions. To reduce the switching loss under light-load conditions, another approach is to turn all of the SRs "off" using a burst mode (intermittently disabling the power supply control circuit and switching circuit). These approaches are still problematic as Electromagnetic Interference (EMI) is still an issue due to switching under light-load conditions and burst mode is complicated to implement.

The soft-switching modulation scheme described herein can help allow and active clamped PSFB converter to operate more reliably, for example, by reducing voltage spikes cause by high-voltage device. The modulation scheme can help reduce EMI under light-load conditions, provide better cost effectiveness since no additional EMI filter is required, and can help reduce operating temperature for the switches, thus helping to reduce switching loss.

Figure 1:
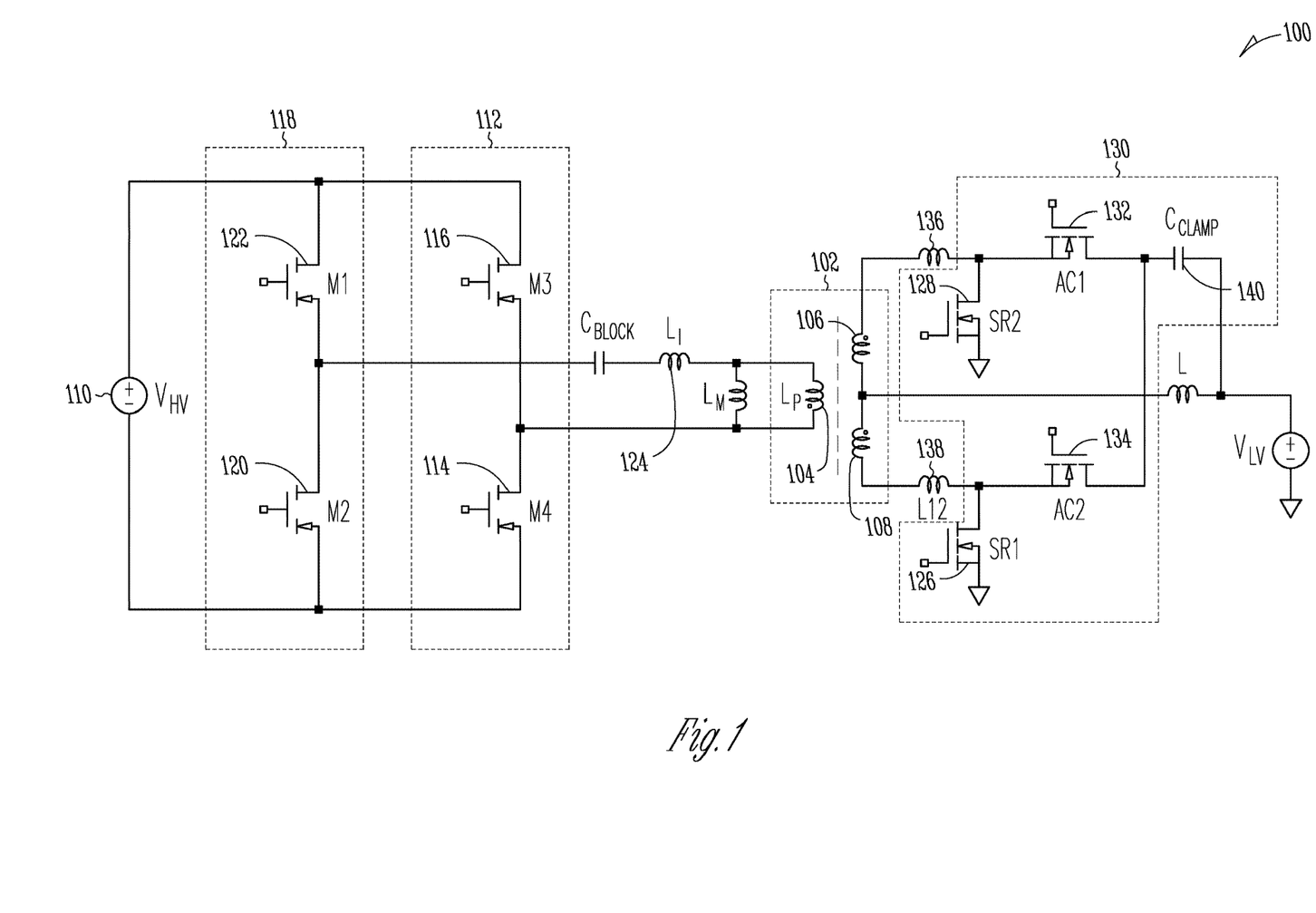
FIG. 1 illustrates an example topology of an active-clamped phase-shift full bridge (PSFB) converter circuit.

FIG. 1 illustrates an example topology of an active-clamped phase-shift full bridge (PSFB) converter circuit 100. The PSFB converter circuit 100 may include a transformer 102 including a primary side and a secondary side. The primary side may include a primary side winding 104 ($L_p$) and the secondary side may include one or more secondary side windings, such as first secondary side winding 106 and second secondary side winding 108 ($L_{S1}$ and $L_{S2}$). The primary side of the transformer 102 may further include an input source 110, which may be a high-voltage source (e.g., a 550 volt source), or any voltage or current source desired or appropriate for a device in which the PSFB may be included.

The primary side of the transformer 102 may include phase-leading circuitry 112 and phase-lagging circuitry 118. Each of the phase-leading circuitry 112 and/or phase-lagging circuitry 118 may include one or more bridge switches or other devices. For example, the phase-leading circuitry 112 can include a first switch 114 ($M_4$) and second switch 116 ($M_3$). Similarly, the phase-lagging circuitry 118 can include a third switch 120 ($M_2$) and a fourth switch 122 ($M_1$). Collectively, the group of switches on the phase-leading circuitry 112 and the phase-lagging circuitry 118 may be referred to as "primary-side devices". In an example, the primary side devices can be FET devices, such as an n-FET, a p-FET, a bipolar transistor, or any similar or equivalent semiconductor switching device. The primary side of the transformer 102 can further include a leakage inductance, such as inductor 124 (Lr) configured to collect and store energy from the input source 110. The inductor 124 can be any appropriate value such as a 10 microHenry inductor. The energy from the input source 110 may be collected and stored or locked in the inductor 124 during, for example, a dead time of the phase-leading circuitry 112 or one of the switches, such as first switch 114 and/or second switch 116 on the phase-leading circuitry 112. or during the "circulating time" when both the primary-side and secondary-side of the transformer 102 are shorted. Then, the energy stored in the inductor 124 may be used to enable soft switching of the phase-lagging circuitry 118 or one of the switches, such as third switch 120 and/or fourth switch 122 on the phase-lagging circuitry 118. Similarly, the energy stored in the inductor 124 can be used to enable soft-switching of the switches in the phase-leading circuitry 112. Stated differently, the energy stored in the inductor 124 may be used to enable the soft-switching of any of the primary-side devices. In an example, the energy stored in the inductor 124 can be released to the load, devices, or switches during a dead-time of any of the switches, meaning a transition time when any of the primary side devices are switching from an "on" state to an "off" state, or vice-versa.

The secondary side of the transformer 102 can include SR switches, such as a first SR switch 126 ($SR_1$) and a second SR switch 128 ($SR_2$) (collectively "the synchronous rectifiers"). In an example, the synchronous rectifiers can be a FET device, such as an n-FET transistor, a p-FET transistor, a bipolar transistor, or any similar or equivalent semiconductor switching device.

The secondary side of the transformer 102 may further include clamping circuitry 130. The clamping circuitry 130 can be coupled to a center tap of the transformer 102. The clamping circuitry 130 can include one or more clamping switches such as a first clamping switch 132 ($AC_1$) and a second clamping switch 134 ($AC_2$), (collectively "the clamping switches"). Similar to the primary side devices and the synchronous rectifiers, the clamping switches can be a FET device, such as an n-FET transistor, a p-FET transistor, a bipolar transistor, or any similar or equivalent semiconductor switching device. The clamping circuitry 130 may also include a clamping capacitor 140, that can collect, store, and release energy to the PSFB circuit.

When SR switches 128 and 126 are turned "on", the secondary side of the transformer 102 may be short circuited or "shorted." While the secondary side of the transformer 102 is shorted, energy from the input source 110 can be stored in the inductor 124, and can be subsequently used for soft-switching of the phase-lagging circuitry 118 (third switch 120 and fourth switch 122). The energy stored in the inductor 124 can be locked or held steady during the circulating time.

The secondary side of the transformer 102 can also include one or more leakage inductances (e.g., leakage inductance energy collectors) such as first leakage inductance 136 ($LI_1$) and second leakage inductance 138 ($LI_2$) (collectively, "the transformer leakage inductances"). The transformer leakage inductances can be coupled to the synchronous rectifiers, and when the clamping switches are "on" energy stored in the clamping capacitor 140 can be released to the transformer leakage inductances. The energy released to the transformer leakage inductances can then be used for soft-switching the synchronous rectifiers, meaning switching the synchronous rectifiers when the voltage across them are low (e.g., between zero and ten volts). Therefore, the synchronous rectifiers can be switched "on" before the phase-leading circuitry 112 as a part of a switching or modulation scheme (e.g., a switching sequence) that can enable soft-switching of the primary side devices.

The topology of the PSFB circuit illustrated and described in FIG. 1 can include additional components (resistors, additional inductors, etc.) or alternate components (e.g., diodes instead of transistors) as desired or appropriate. The PSFB circuit can include any components capable of performing the functions or implementing the soft-switching scheme described herein.

Figure 2:
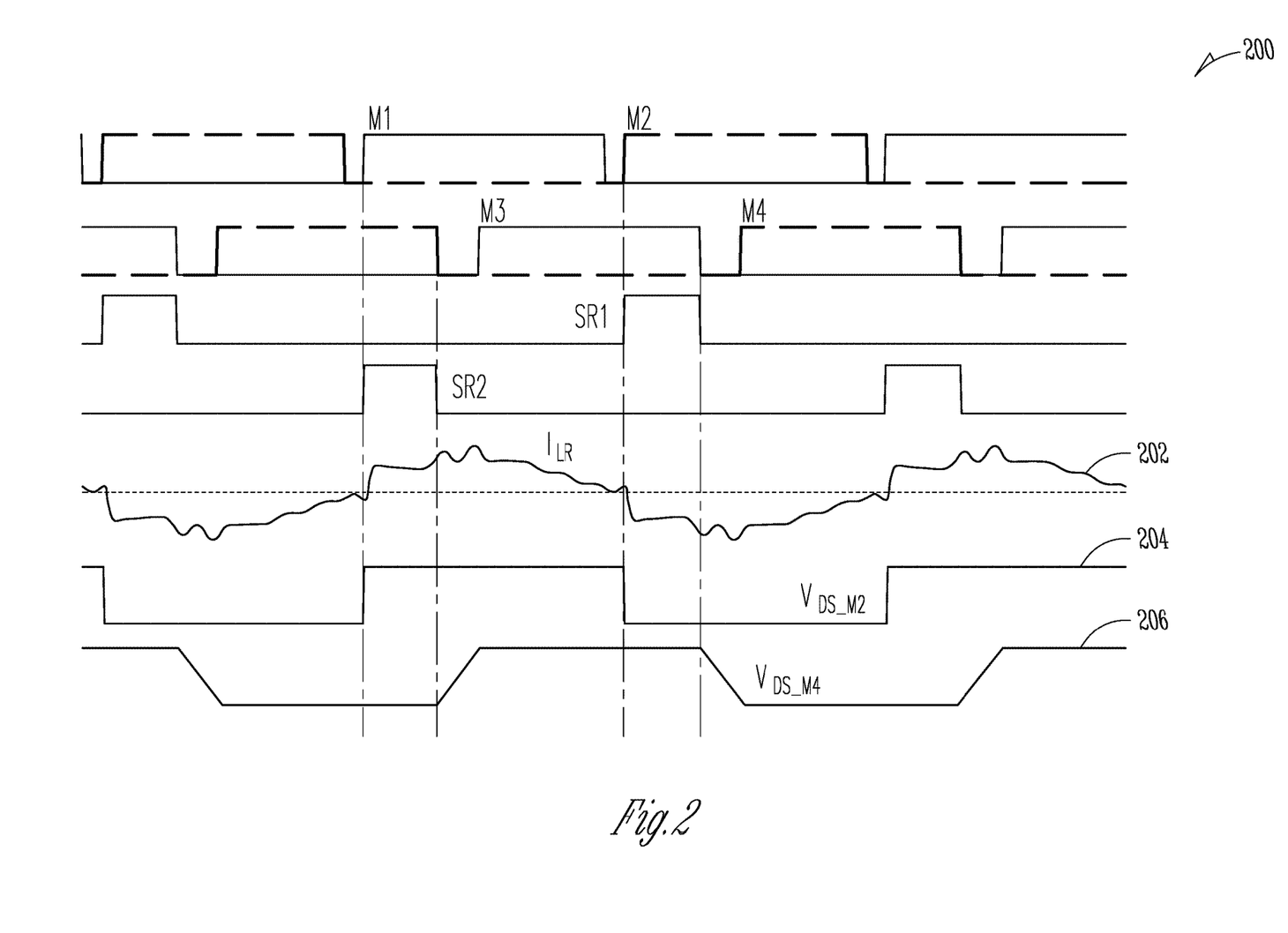
FIG. 2 illustrates an example graph of waveforms of a PSFB converter circuit under light-load conditions.

FIG. 2 illustrates an example graph 200 of waveforms of a PSFB converter circuit under light-load conditions. Specifically, FIG. 2 illustrates the current waveform 202 through the inductor 124 as the primary side devices are being switched, as well as the voltage waveform 204 across the third switch 120 ($M_2$) in the phase-lagging circuitry 118, and a second voltage waveform 206 across the first switch 114 ($M_4$) in the phase-leading circuitry 112. As illustrated in FIG. 2, the energy stored in the inductor 124 helps to enable soft switching of the first switch 114 ($M_4$) because it is turned "on" when the voltage across the first switch 114, shown by the second voltage waveform 206 is low. Conversely, the third switch 120 ($M_2$) is hard-switching since the current through the inductor 124, as shown by current waveform 202, is small when switch 122 ($M_1$) is turned off, the voltage across the third switch 120 is high. However, the inductor 124 may not, alone, be enough to enable soft-switching of all the primary side devices. Thus, the PSFB can still experience high switching loss and high EMI or noise, each of which are undesirable.

Figure 3:
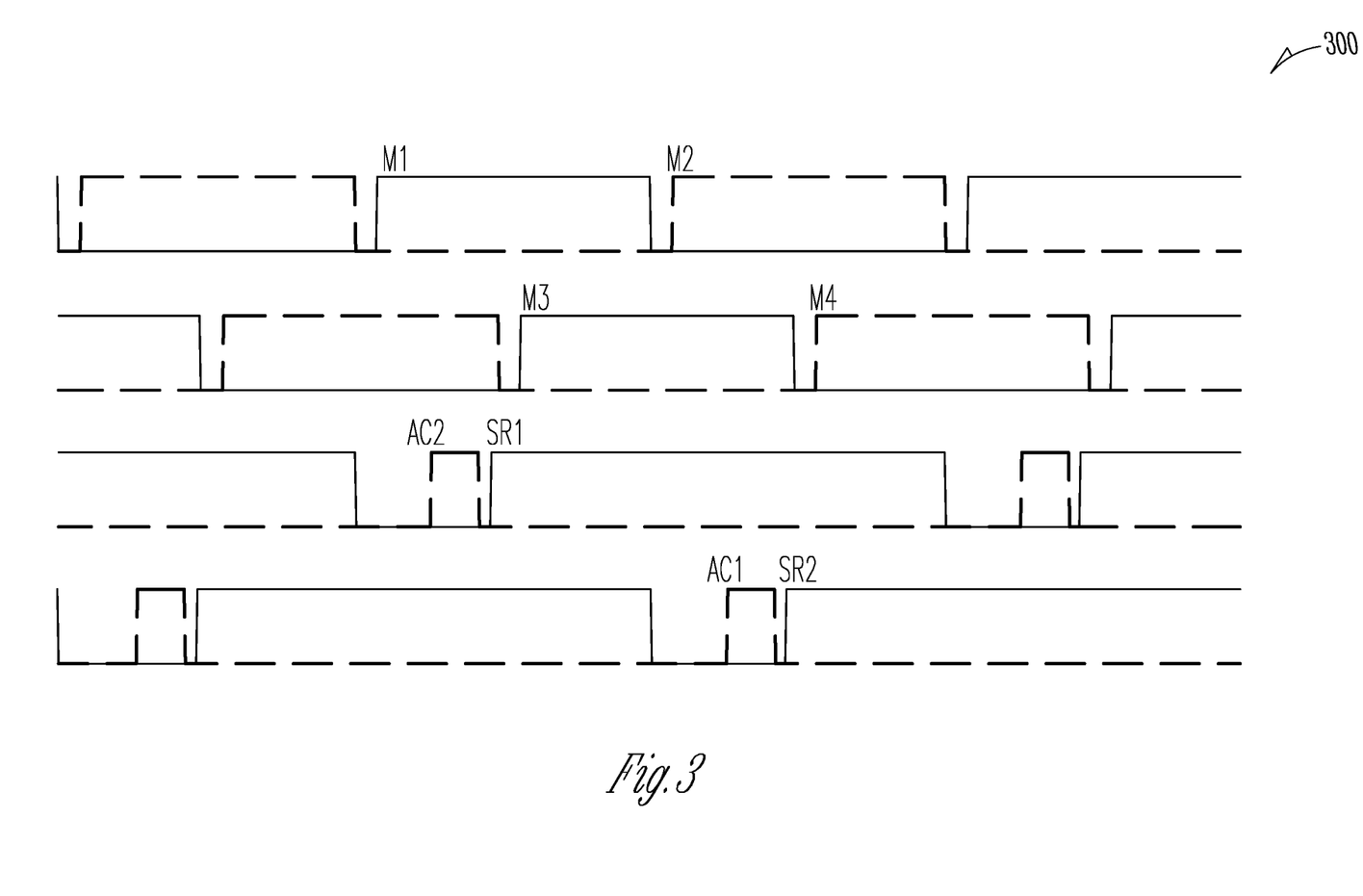
FIG. 3 illustrates an example switching sequence of the primary side devices, the synchronous rectifiers, and the clamping switches to enable soft-switching of primary side devices.

FIG. 3 illustrates an example switching sequence 300 of the primary side devices, the synchronous rectifiers, and the clamping switches to enable soft-switching of the primary side devices. As illustrated in FIG. 3, the SR switches can be turned "on" before the switches of the leading-leg circuitry are turned "on". For example, the first SR switch 126 can be turned "on" before the first switch 114 ($M_4$) in the phase-leading circuitry 112 is turned "off". Similarly, second SR switch 128 can be turned "on" before the second switch 116 ($M_3$) in the phase-leading circuitry 112 is turned "off"

As also illustrated in FIG. 3, the synchronous rectifiers and the switches or devices in the phase-lagging circuitry 118 can be switched substantially simultaneously or at substantially the same time. For example, the second SR switch 128 ($SR_1$) and the third switch 120 ($M_2$) in the phase-lagging circuitry 118 can be switched "off" at substantially the same time, and the second SR switch 128 ($SR_2$) and the fourth switch 122 ($M_1$) can be switched "off" at substantially the same time.

Figure 4:
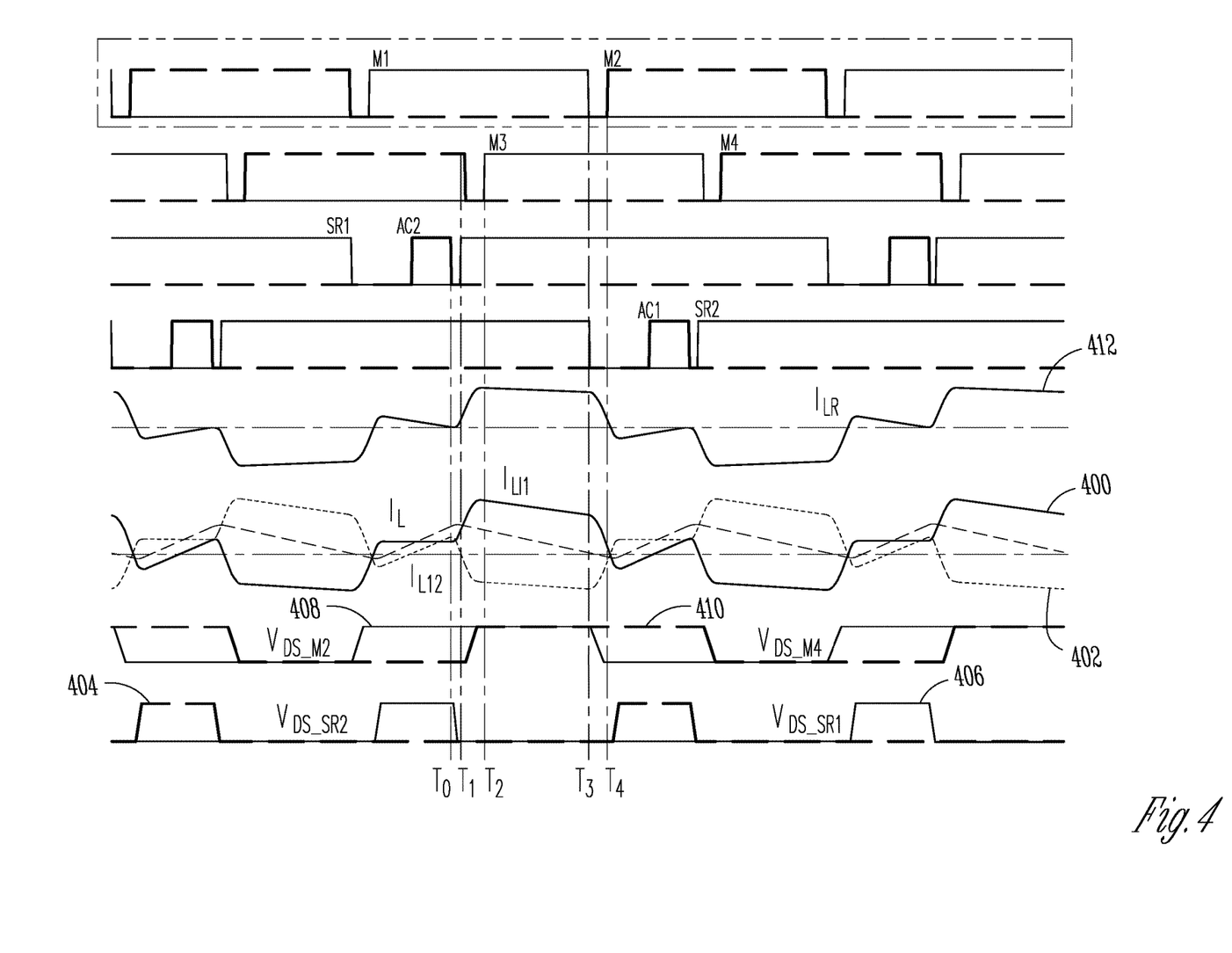
FIG. 4 illustrates the switching sequence illustrated in FIG. 3 with current and voltage waveforms under light-load conditions.

FIG. 4 illustrates the switching scheme illustrated in FIG. 3 with current and voltage waveforms under light-load conditions. When the clamping switches (first clamping switch 132 and second clamping switch 134) are "on" the energy stored in the clamping capacitor 140 is released to the transformer leakage inductances. In FIG. 4, first current waveform 400 corresponds to the current through the first leakage inductance 136 and the second current waveform 402 corresponds to the current through the second leakage inductance 138. The energy stored in the first leakage inductance 136 and the second leakage inductance 138 can be used for soft-switching for the synchronous rectifiers as illustrated by the first voltage waveform 404 corresponding to the voltage across the second SR switch 128 and the second voltage waveform 406 corresponding to the voltage across the first SR switch 126. Therefore, the synchronous rectifiers can be switched or turn "on" before the switches in the phase-leading circuitry 112 (the first switch 114 and the second switch 116, $M_3$ and $M_4$) which can aid with soft-switching the phase-leading circuitry 112.

Additional energy from the input source may be stored in the inductor 124, Lr, such as during the dead-time of the phase-leading circuitry 112 ($M_3$ & $M_4$) because the secondary side of the transformer 102 is shorted. The energy stored in the leakage inductance is locked during the circulating mode (e.g., between $t_2$ and $t_3$), which may correspond to a time in which the secondary side of the transformer 102 is shorted. Between to and $t_2$ the amount of energy stored in the inductor 124 increases significantly as illustrated by the third current waveform 412, and this additional energy helps the soft-switching of the primary side devices between $t_3$ and $t_4$. Thus, as shown by the third voltage waveform 408 corresponding to the voltage across third switch 120 ($M_2$) (which goes to zero between $t_3$ and $t_4$) and the fourth voltage waveform 410 corresponding to the voltage across first switch 114 ($M_4$) the switches in both the phase-leading circuitry 112 and the phase-lagging circuitry 118 can be soft-switched.

The dead time between the clamping switches and the synchronous rectifies (e.g., between to and $t_1$) is less than the dead time between the primary side devices (e.g., between $t_1$ and $t_2$ or between $t_3$ and $t_4$). All dead times may be predefined and determined by a resonance frequency between the device output capacitance and the leakage inductance of the transformer 102. The pulse-width of the clamping switches (e.g., the time between $t_5$ and $t_6$) may be a constant period of time and be related to the stored energy in the clamping capacitor 140 and a voltage rating of a device in which the PSFB converter is included or coupled to.

Figure 5:
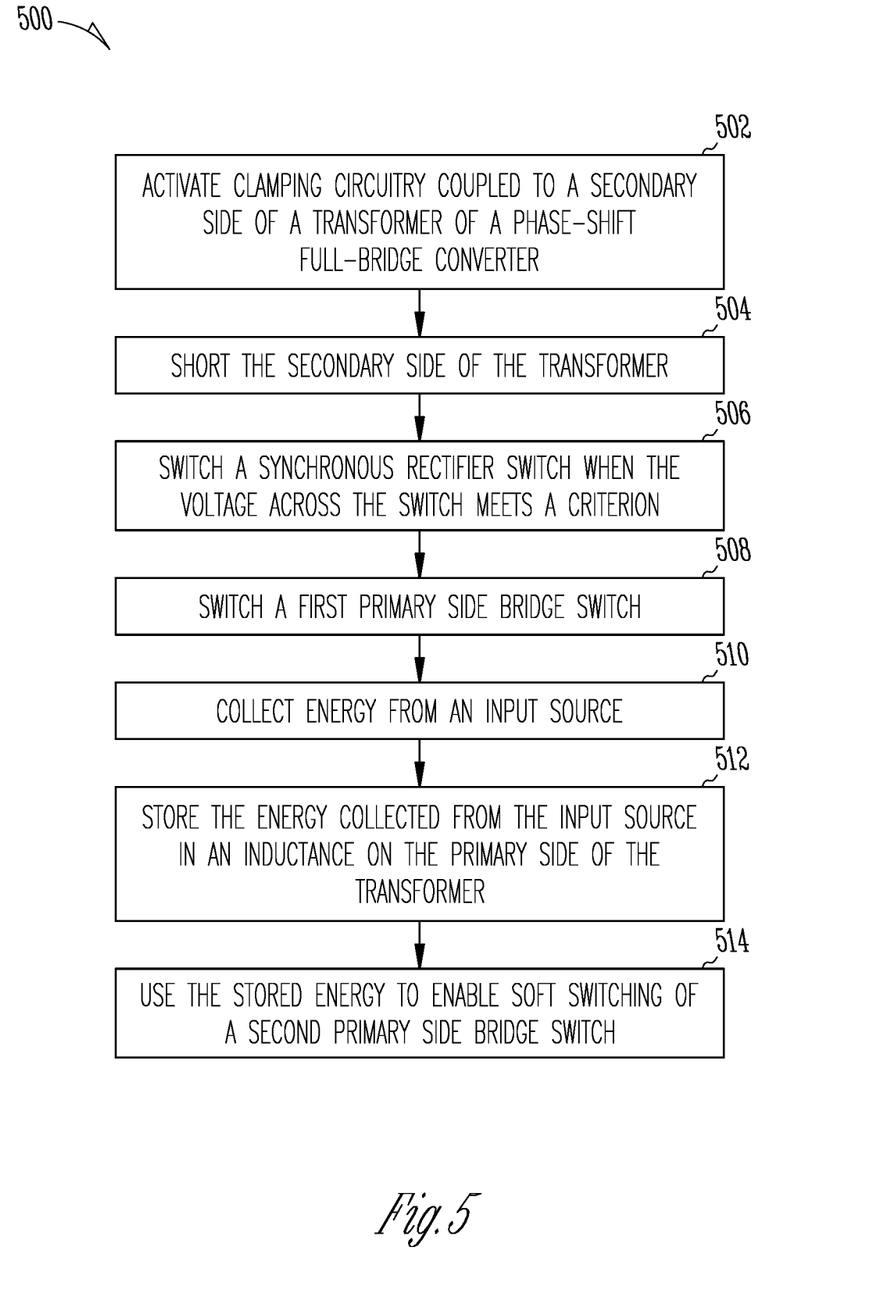
FIG. 5 is an example of a flowchart illustrating portions of a method of a soft-switching modulation of a Phase-Shift Full-Bridge (PSFB) converter circuit.

FIG. 5 is an example of a flowchart illustrating portions of a method 500 of a soft-switching modulation of a Phase-Shift Full-Bridge (PSFB) converter circuit. The method 500 may include a series of operations or steps that may be utilized to perform the method 500. At 502, clamping circuitry coupled to a secondary side of a transformer of the PSFB circuit may be activated. The clamping circuitry can include a clamping capacitor and one or more clamping switches. At 504, the secondary side of the transformer may be shorted. The shorting of the secondary side of the transformer may occur simultaneously or substantially near in time to the activating of the SR switches of the clamping circuitry at 502. At 506, a synchronous rectifier switch coupled to the secondary side of the transformer may be switched when a voltage across the synchronous rectifier switch meets a criterion. For example, the synchronous rectifier switch can be switched when the voltage across the synchronous rectifier switch is between a specified first and second voltage. (e.g., between zero and ten volts). In another example, the synchronous rectifier switch can be switched when the voltage across it reaches or drops to a specified value (e.g., 1 volt). In an example, a leakage inductance energy collector, such as a capacitor included in the clamping circuitry may be coupled to the synchronous rectifier switch. The leakage inductance energy collector may be configured to collect leakage inductance energy from the clamping capacitor and use the leakage inductance energy collected to enable the soft-switching of the synchronous rectifier switch.

At 508, a first primary side switch bridge switch may be switched. This may be a switch such as the first switch 114, second switch 116, third switch 120, and/or fourth switch 122 discussed for FIG. 1. At 510, energy from an input source may be collected and at 512 the energy collected may be stored in an inductance (e.g., an inductor) included on the primary side of the transformer. The energy from the input source may be collected and stored in the inductor during at least one of a dead time or a circulating time. At 514, the stored energy may be used to enable soft-switching of a second primary side bridge switch. In an example, the soft-switching may be performed when a voltage across the second primary side bridge switch is between a specified first and second voltage. Alternatively, the soft switching may be performed when a voltage across the second primary side bridge switch is at, reaches, is lowered to, etc., a specified voltage (e.g., zero volts).

A pulse width of a control signal to the one or more clamping switches may be based on at least one of an amount of energy stored in the clamping capacitor or a voltage rating of at least one of the first primary side bridge switch or the second primary side bridge switch (or any device coupled to the primary side of the transformer). The clamping circuitry may be used to reduce or eliminate a voltage spike in at least one of the first primary side bridge switch or the second primary side bridge switch.

A potential advantage of the modulation or switching scheme is that it is not load sensitive. While the switching scheme has been discussed in the context of light-load conditions, it is suitable for applications with a wide-load range and low EMI requirements, such as the EV LDC for electric vehicles. The clamping circuitry can help reduce or eliminate voltage spikes through the switches, which can increase the reliability of the high-voltage devices connected to the PSFB converter. Because the PSFB converter experiences soft-switching, there is low EMI, even under light-load conditions, and there is no additional cost for this soft-switching realization because the converter may not require an additional EMI filter, which makes the converter more cost effective. Also, because switching loss is reduced as a result of the soft-switching, the temperature of the device coupled to the converter may be reduced. For example, soft switching at 33.5 degrees Celsius versus hard switching at 86.9 degrees Celsius.

The PSFB circuit described herein may include additional or alternate circuit components than those illustrated (such as in FIG. 1). The PSFB circuit may include any components that allow the circuit to function as described (e.g., enabling the clamping circuitry to short circuit the secondary side of the transformer, collect and store leakage inductance energy, and use the stored leakage inductance energy for soft-switching the primary side switches). Thus, comparable or equivalent PSFB converter circuits may include resistors, diodes, additional inductors or capacitors, as necessary, desired, or appropriate, and is not limited to the topology of FIG. 1.

ADDITIONAL NOTES AND EXAMPLES

Example 1 is a soft-switching Phase-Shift Full-Bridge (PSFB) converter system, comprising: a PSFB converter circuit, including: a transformer comprising a primary side and a secondary side; phase-leading circuitry located on the primary side of the transformer; phase-lagging circuitry located on the primary side of the transformer; and clamping circuitry coupled to the secondary side of the transformer, wherein the clamping circuitry is configurable to, when in an active clamping mode, short the secondary side of the transformer.

In Example 2, the subject matter of Example 1 optionally includes wherein the PSFB converter circuit further includes: a synchronous rectifier switch, coupled to the secondary side of the transformer; a leakage inductance energy collector, coupled to the synchronous rectifier switch, wherein the leakage inductance collector is configured to collect leakage inductance energy and to use the collected leakage inductance energy to enable switching of the synchronous rectifier switch when a voltage across the synchronous rectifier switch is between a specified first voltage level and specified second voltage level; a first primary side bridge switch coupled to the phase-leading circuitry; a second primary side bridge switch coupled to the phase-lagging circuitry; and an inductor located on the primary side of the transformer to collect and store energy from an input source when the secondary side of the transformer is shorted.

In Example 3, the subject matter of Example 2 optionally includes wherein the PSFB converter circuit further includes: a third primary side bridge switch coupled to the phase-leading circuitry; and a fourth primary side bridge switch coupled to the phase-lagging circuitry.

In Example 4, the subject matter of Example 3 optionally includes wherein the clamping circuitry includes a clamping capacitor and a first clamping switch, and wherein when the first clamping switch is closed, energy stored in the clamping capacitor is provided to the leakage inductance energy collector as the leakage inductance energy.

In Example 5, the subject matter of Example 4 optionally includes wherein the first clamping switch, the first primary side bridge switch and the third primary side bridge switch are deactivated concurrently and wherein the synchronous rectifier switch, the second primary side bridge switch and the fourth primary side bridge switch are deactivated concurrently.

In Example 6, the subject matter of any one or more of Examples 4-5 optionally include wherein the clamping circuitry further includes a second clamping switch.

In Example 7, the subject matter of any one or more of Examples 4-6 optionally include wherein a pulse width of a control signal to the clamping switch is based on at least one of an amount of energy stored in the clamping capacitor or a voltage rating of at least one of the first primary side bridge switch, the second primary side bridge switch, the third primary side bridge switch, or the fourth primary side bridge switch.

In Example 8, the subject matter of any one or more of Examples 4-7 optionally include wherein the clamping circuitry is further configurable to reduce or eliminate a voltage spike in at least one of the first primary side bridge switch, the second primary side bridge switch, the third primary side bridge switch, or the fourth primary side bridge switch.

In Example 9, the subject matter of any one or more of Examples 2-8 optionally include wherein the energy from an input source is collected and stored in the inductor when the secondary-side of the transformer is shorted, and wherein the energy stored in the inductor is used to enable soft switching of the second primary side bridge switch.

In Example 10, the subject matter of any one or more of Examples 2-9 optionally include wherein the energy from an input source is collected and stored in the inductor when the secondary-side of the transformer is shorted, and wherein the energy stored in the inductor is used to enable soft switching of the second primary side bridge switch.

In Example 11, the subject matter of any one or more of Examples 1-10 optionally include wherein the PSFB converter circuit is included in an electric vehicle battery charger.

In Example 12, the subject matter of any one or more of Examples 1-11 optionally include wherein the PSFB converter circuit is included in an electric vehicle low-voltage power supply.

Example 13 is a method of soft-switching modulation of a Phase-Shift Full-Bridge (PSFB) converter circuit, the method comprising; activating clamping circuitry coupled to a secondary side of a transformer, wherein the active clamping circuitry includes clamping capacitor and a first clamping switch; shorting the secondary side of the transformer; switching a synchronous rectifier switch, coupled to the secondary side of the transformer, when a voltage across the synchronous rectifier switch is between specified first and second voltage levels; switching a first primary side bridge switch; collecting energy from an input source during when the secondary-side of the transformer is shorted; storing the collected energy in an inductor; and using the stored energy to enable switching of a second primary side bridge switch.

In Example 14, the subject matter of Example 13 optionally includes reducing or eliminating, using the clamping circuitry, a voltage spike in at least one of the first primary side bridge switch, or the second primary side bridge switch.

In Example 15, the subject matter of any one or more of Examples 13-14 optionally include wherein a pulse width of a control signal to the first clamping switch is based on at least one of an amount of energy stored in the clamping capacitor or a voltage rating of at least one of the first primary side bridge switch or the second primary side bridge switch.

In Example 16, the subject matter of any one or more of Examples 13-15 optionally include wherein the energy from an input source is collected and stored in the inductor during at least one of a dead time or a circulating time of the first primary side bridge switch, and wherein the energy stored in the inductor is used to enable soft switching of the second primary side bridge switch.

Example 17 is a soft-switching Phase-Shift Full-Bridge (PSFB) converter system, comprising: a PSFB converter circuit, including: a transformer comprising a primary side and a secondary side; phase-leading circuitry located on the primary side of the transformer; phase lagging circuitry located on the primary side of the transformer; a synchronous rectifier switch, coupled to the secondary side of the transformer; a leakage inductance energy collector, coupled to the synchronous rectifier switch, wherein the leakage inductance collector is configured to collect leakage inductance energy and to use the leakage inductance energy to enable switching of the synchronous rectifier switch when a voltage across the synchronous rectifier switch is between a specified first voltage level and specified second voltage level; a first primary side bridge switch coupled to the phase-leading circuitry; a second primary side bridge switch coupled to the phase-lagging circuitry; and clamping circuitry coupled to the secondary side of the transformer, wherein the clamping circuitry is configurable to, when in an active clamping mode, short the secondary side of the transformer.

In Example 18, the subject matter of Example 17 optionally includes an inductance located on the primary side of the transformer to collect and store energy from an energy input source when the secondary side of the transformer is shorted.

In Example 19, the subject matter of Example 18 optionally includes when energy from an input source is collected and store in the inductance when the secondary-side of the transformer is shorted, and wherein the energy stored in the inductance is used to enable soft switching of the second primary side bridge switch.

In Example 20, the subject matter of any one or more of Examples 17-19 optionally include wherein the PSFB converter further includes a third primary side bridge switch coupled to the phase-leading circuitry and a fourth primary side bridge switch coupled to the phase-lagging circuitry, and wherein clamping circuitry is further configurable to reduce or eliminate a voltage spike in at least one of the first primary side bridge switch, the second primary side bridge switch, the third primary side bridge switch, or the fourth primary side bridge switch.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A soft-switching Phase-Shift Full-Bridge (PSFB) converter system, comprising:
   a PSFB converter circuit, including:
      a transformer comprising a primary side and a secondary side;
      phase-leading circuitry located on the primary side of the transformer;
      phase-lagging circuitry located on the primary side of the transformer; and
   clamping circuitry coupled to the secondary side of the transformer, wherein the clamping circuitry is configurable to, when in an active clamping mode, short the secondary side of the transformer.

2. The system of claim 1, wherein the PSFB converter circuit further includes:
   a synchronous rectifier switch, coupled to the secondary side of the transformer;
   a leakage inductance energy collector, coupled to the synchronous rectifier switch, wherein the leakage inductance collector is configured to collect leakage inductance energy and to use the collected leakage inductance energy to enable switching of the synchronous rectifier switch when a voltage across the synchronous rectifier switch is between a specified first voltage level and specified second voltage level;
   a first primary side bridge switch coupled to the phase-leading circuitry;
   a second primary side bridge switch coupled to the phase-lagging circuitry; and
   an inductor located on the primary side of the transformer to collect and store energy from an input source when the secondary side of the transformer is shorted.

3. The system of claim 2, wherein the PSFB converter circuit further includes:
   a third primary side bridge switch coupled to the phase-leading circuitry; and
   a fourth primary side bridge switch coupled to the phase-lagging circuitry.

4. The system of claim 3, wherein the clamping circuitry includes a clamping capacitor and a first clamping switch, and wherein when the first clamping switch is closed, energy stored in the clamping capacitor is provided to the leakage inductance energy collector as the leakage inductance energy.

5. The system of claim 4, wherein the first clamping switch, the first primary side bridge switch and the third primary side bridge switch are deactivated concurrently and wherein the synchronous rectifier switch, the second primary side bridge switch and the fourth primary side bridge switch are deactivated concurrently.

6. The system of claim 4, wherein the clamping circuitry further includes a second clamping switch.

7. The system of claim 4, wherein a pulse width of a control signal to the clamping switch is based on at least one of an amount of energy stored in the clamping capacitor or a voltage rating of at least one of the first primary side bridge switch, the second primary side bridge switch, the third primary side bridge switch, or the fourth primary side bridge switch.

8. The system of claim 4, wherein the clamping circuitry is further configurable to reduce or eliminate a voltage spike in at least one of the first primary side bridge switch, the second primary side bridge switch, the third primary side bridge switch, or the fourth primary side bridge switch.

9. The system of claim 2, wherein the energy from an input source is collected and stored in the inductor when the secondary-side of the transformer is shorted, and wherein the energy stored in the inductor is used to enable soft switching of the second primary side bridge switch.

10. The system of claim 2, wherein the energy from an input source is collected and stored in the inductor when the secondary-side of the transformer is shorted, and wherein the energy stored in the inductor is used to enable soft switching of the second primary side bridge switch.

11. The system of claim 1, wherein the PSFB converter circuit is included in an electric vehicle battery charger.

12. The system of claim 1, wherein the PSFB converter circuit is included in an electric vehicle low-voltage power supply.

13. A method of soft-switching modulation of a Phase-Shift Full-Bridge (PSFB) converter circuit, the method comprising;
   activating clamping circuitry coupled to a secondary side of a transformer, wherein the active clamping circuitry includes clamping capacitor and a first clamping switch;
   shorting the secondary side of the transformer;
   switching a synchronous rectifier switch, coupled to the secondary side of the transformer, when a voltage across the synchronous rectifier switch is between specified first and second voltage levels;

switching a first primary side bridge switch;

collecting energy from an input source during when the secondary-side of the transformer is shorted;

storing the collected energy in an inductor; and using the stored energy to enable switching of a second primary side bridge switch.

14. The method of claim 13, further comprising:

reducing or eliminating, using the clamping circuitry, a voltage spike in at least one of the first primary side bridge switch, or the second primary side bridge switch.

15. The method of claim 13, wherein a pulse width of a control signal to the first clamping switch is based on at least one of an amount of energy stored in the clamping capacitor or a voltage rating of at least one of the first primary side bridge switch or the second primary side bridge switch.

16. The method of claim 13, wherein the energy from an input source is collected and stored in the inductor during at least one of a dead time or a circulating time of the first primary side bridge switch, and wherein the energy stored in the inductor is used to enable soft switching of the second primary side bridge switch.

17. A soft-switching Phase-Shift Full-Bridge (PSFB) converter system, comprising:

a PSFB converter circuit, including:
  a transformer comprising a primary side and a secondary side;
  phase-leading circuitry located on the primary side of the transformer;
  phase lagging circuitry located on the primary side of the transformer;
  a synchronous rectifier switch, coupled to the secondary side of the transformer;
  a leakage inductance energy collector, coupled to the synchronous rectifier switch, wherein the leakage inductance collector is configured to collect leakage inductance energy and to use the leakage inductance energy to enable switching of the synchronous rectifier switch when a voltage across the synchronous rectifier switch is between a specified first voltage level and specified second voltage level;
  a first primary side bridge switch coupled to the phase-leading circuitry;
  a second primary side bridge switch coupled to the phase-lagging circuitry; and
  clamping circuitry coupled to the secondary side of the transformer, wherein the clamping circuitry is configurable to, when in an active clamping mode, short the secondary side of the transformer.

18. The system of claim 17, further comprising:

an inductance located on the primary side of the transformer to collect and store energy from an energy input source when the secondary side of the transformer is shorted.

19. The system of claim 18, when energy from an input source is collected and store in the inductance when the secondary-side of the transformer is shorted, and wherein the energy stored in the inductance is used to enable soft switching of the second primary side bridge switch.

20. The system of claim 17, wherein the PSFB converter further includes a third primary side bridge switch coupled to the phase-leading circuitry and a fourth primary side bridge switch coupled to the phase-lagging circuitry, and wherein clamping circuitry is further configurable to reduce or eliminate a voltage spike in at least one of the first primary side bridge switch, the second primary side bridge switch, the third primary side bridge switch, or the fourth primary side bridge switch.

* * * * *